United States Patent
Humenick et al.

(10) Patent No.: US 12,314,790 B2
(45) Date of Patent: May 27, 2025

(54) SYSTEMS AND METHODS FOR DYNAMIC PRINT HEAD ADJUSTMENT FOR SUBLIMATION INK PRINTING

(71) Applicant: Sekisui Kydex, LLC, Bloomsburg, PA (US)

(72) Inventors: Jeffrey Humenick, Bloomsburg, PA (US); Jym Kauffman, Bloomsburg, PA (US); Rebecca Gallup, Bloomsburg, PA (US)

(73) Assignee: Sekisui Kydex, LLC, Bloomsburg, PA (US)

( * ) Notice: Subject to any disclaimer, the term of this patent is extended or adjusted under 35 U.S.C. 154(b) by 151 days.

(21) Appl. No.: 17/854,915

(22) Filed: Jun. 30, 2022

(65) Prior Publication Data
US 2023/0013480 A1    Jan. 19, 2023

Related U.S. Application Data

(60) Provisional application No. 63/217,731, filed on Jul. 1, 2021.

(51) Int. Cl.
*B41M 5/035* (2006.01)
*G06K 15/00* (2006.01)
*G06K 15/02* (2006.01)

(52) U.S. Cl.
CPC ............ *G06K 15/00* (2013.01); *G06K 15/02* (2013.01); *G06K 15/028* (2013.01); *B41M 5/035* (2013.01)

(58) Field of Classification Search
None
See application file for complete search history.

(56) References Cited

U.S. PATENT DOCUMENTS

| | | |
|---|---|---|
| 5,644,351 A | 7/1997 | Matsumoto et al. |
| 6,027,264 A | 2/2000 | Maher et al. |
| 2003/0007023 A1 | 1/2003 | Barclay et al. |
| 2007/0025794 A1 * | 2/2007 | Kubin ................ B41J 13/103 |
| 2010/0238221 A1 | 9/2010 | Uchida et al. |
| 2011/0229664 A1 | 9/2011 | Hoggard |
| 2012/0196085 A1 | 8/2012 | Langan et al. |

(Continued)

FOREIGN PATENT DOCUMENTS

| | | |
|---|---|---|
| JP | 2002292856 A * | 10/2002 |
| WO | WO-2020/162958 A1 | 8/2020 |

OTHER PUBLICATIONS

English translation of JP-2002292856-A. (Year: 2002).*

(Continued)

*Primary Examiner* — Thomas D Lee
(74) *Attorney, Agent, or Firm* — Foley & Lardner LLP

(57) ABSTRACT

In an illustrative embodiment, a processor determines an ink coverage for a portion of an image and retrieves one or more input parameters for the portion. The processor may adjust the height of the print head (i.e., the distance between the print head and a paper where the image is to be printed) based upon the ink coverage and the one or more input parameters. In particular, the processor may optimize the height of the print head for image clarity while preventing head strikes. In some embodiments, the processor for may maintain the same height for an image. In other embodiments, the processor may dynamically adjust the height while printing for different portions of the image.

7 Claims, 7 Drawing Sheets

(56) References Cited

U.S. PATENT DOCUMENTS

| | | |
|---|---|---|
| 2013/0249979 A1 | 9/2013 | Wing et al. |
| 2015/0028094 A1 | 1/2015 | Will et al. |
| 2015/0029289 A1 | 1/2015 | Rosner et al. |
| 2015/0258821 A1* | 9/2015 | Fujinami .................. B41J 29/38 |
| | | 347/39 |
| 2016/0114593 A1 | 4/2016 | Ume |
| 2016/0121625 A1 | 5/2016 | Kodama |
| 2020/0307285 A1 | 10/2020 | Mano et al. |

OTHER PUBLICATIONS

Invitation to Pay Addtl. Fees on PCT Appl. Ser. No. PCT/US2022/035442, dated Sep. 2, 2022 (2 pages).
International Search Report and Written Opinion on PCT Appl. PCT/US2022/035442 dated Nov. 1, 2022 (11 pages).
Extended European Search Report for Application No. 22834114.5 mailing date Apr. 4, 2025, 9 pages.

* cited by examiner

300

400

Determine an amount of ink coverage of a portion of an image to be printed on a sheet using sublimation ink
602

Retrieve a set of one or more input parameters associated with printing the portion of the image
604

Set a distance between a print head and the sheet on which the portion of the image is being printed based upon the amount of ink coverage and the set of one or more input parameters
606

Dynamically adjust while printing, the distance between the print head and the sheet for a second portion of the image based on a second amount of ink coverage for the second portion and a second set of one or more parameters associated with printing the second portion
608

```
┌─────────────────────────────────────────────────────────┐
│  Determine an amount of ink coverage of a portion of    │
│                  the image to be printed                │
│                           702                           │
└─────────────────────────────────────────────────────────┘
                             │
                             ▼
┌─────────────────────────────────────────────────────────┐
│  Retrieve a set of one or more input parameters         │
│  associated with printing the portion of the image      │
│                           704                           │
└─────────────────────────────────────────────────────────┘
                             │
                             ▼
┌─────────────────────────────────────────────────────────┐
│  Adjust a distance between a print head and a sheet on  │
│  which the portion of the image is being printed based  │
│  upon the ink coverage and the set of one or more       │
│  input parameters                                       │
│                           706                           │
└─────────────────────────────────────────────────────────┘
```

SYSTEMS AND METHODS FOR DYNAMIC PRINT HEAD ADJUSTMENT FOR SUBLIMATION INK PRINTING

CROSS-REFERENCE TO RELATED APPLICATIONS

This application claims the benefit of and priority to U.S. Provisional Application No. 63/217,731, filed Jul. 1, 2021, the entire disclosure of which is incorporated by reference herein.

TECHNICAL FIELD

This application is directed generally to printing images for dye sublimation and more specifically towards dynamically adjusting print head to an optimal height for better image clarity and avoiding head strikes when printing the images.

BACKGROUND

Dye sublimation is a process of infusing images to a substrate. An image to be infused is printed on a paper (or any type of sheet) using sublimation dyes (contained in the sublimation inks) and the printed paper is pressed against a substrate (generally a thermoplastic material) under heat. The heat causes the dyes to sublimate from a solid state on the printed paper to a gaseous state to travel to the substrate, where the dyes are deposited as solids. This sublimation process therefore infuses the image on the printed paper into the substrate. As the infused image is embedded within the substrate, the image may not chip, fade, or delaminate like capped and printed images.

Printers for printing images to be infused are supplied with sublimation inks containing sublimation dyes. These printers generally use an inkjet process to deposit the sublimation inks on the paper to form an image that can be used for dye sublimation to infuse the image into a substrate. More particularly, a print head within a printer may spray jets of the sublimation inks that are deposited onto the paper forming at least a portion of the image. A computer may be connected to a printer to provide digital files, commands, and other inputs for printing.

However, conventional printers for printing images for dye sublimation include print heads that are only manually adjustable. For example, FIG. 1 shows a conventional printer 100 where a height of print head can only be manually adjusted using a height adjusting lever 102. The printer 100 may have a single default height for printing all the images. The height adjustment process is manual and cumbersome requiring a user to manipulate the height adjusting lever 102 and a lock screw (not shown). For adjusting the height of the print head, a user has to unlock the lock screw, move the height adjusting lever 102, and then relock the lock screw. During this manual adjustment process, the printer 100 cannot be used for printing thereby increasing its downtime.

As such, a significant improvement on printers for printing images for dye sublimation is therefore desired.

SUMMARY

What is therefore desired are systems and methods that automatically adjust the height of the print head based upon ink coverage and one or more input parameters. What is further desired are systems and methods that automatically optimize the height of the print head for image clarity while avoiding head strikes.

Embodiments described herein attempt to solve the aforementioned technical problems and may provide other solutions as well. In an illustrative embodiment, a processor determines an ink coverage for a portion of an image and retrieves one or more input parameters for the portion. The processor may adjust the height of the print head (i.e., the distance between the print head and a paper where the image is to be printed) based upon the ink coverage and the one or more input parameters. In particular, the processor may optimize the height of the print head for image clarity while preventing head strikes. In some embodiments, the processor may maintain the same height for an image. In other embodiments, the processor may dynamically adjust the height while printing for different portions of the image.

In one embodiment, a computer-implemented method for printing an image to be infused into a substrate through dye sublimation comprises determining, by a computer, an amount of ink coverage of the image to be printed on a sheet using sublimation ink; in response to the computer determining that the amount of ink coverage is below a predetermined threshold: retrieving, by the computer, a set of one or more input parameters associated with printing the image; and adjusting, by the computer, a distance between a print head and the sheet on which the image is being printed based upon the amount of ink coverage and the set of one or more input parameters, wherein the distance remains constant throughout the printing of the image.

In one embodiment, a system for printing an image to be infused into a substrate through dye sublimation comprises a non-transitory storage medium storing a plurality of computer program instructions; and a processor electrically coupled to the non-transitory storage medium and configured to execute the plurality of computer program instructions to: determine an amount of ink coverage of a portion of the image to be printed on a sheet using sublimation ink; retrieve a set of one or more input parameters associated with printing the portion of the image; set a distance between a print head and the sheet on which the portion of the image is being printed based upon the amount of ink coverage and the set of one or more input parameters; and dynamically adjust, while printing, the distance between the print head and the sheet for a second portion of the image based on a second amount of ink coverage for the second portion and a second set of one or more parameters associated with printing the second portion.

In yet another embodiment, a computer-implemented method for printing an image to be infused into a substrate through dye sublimation comprises determining, by a computer, an amount of ink coverage of a portion of the image to be printed; retrieving, by the computer, a set of one or more input parameters associated with printing the portion of image; and adjusting, by the computer, a distance between a print head and a sheet on which the portion of the image is being printed based upon the ink coverage and the set of one or more input parameters.

It is to be understood that both the foregoing general description and the following detailed description are exemplary and explanatory and are intended to provide further explanation of the disclosed embodiment and subject matter as claimed.

BRIEF DESCRIPTION OF THE DRAWINGS

The accompanying drawings constitute a part of this specification and illustrate embodiments of the subject matter disclosed herein.

FIG. 6 shows a flow diagram of an illustrative method for automatically adjusting print head height, according to an embodiment; and FIG. 7 shows a flow diagram of an illustrative method for automatically adjusting print head height, according to an embodiment.

DETAILED DESCRIPTION

Figure 1:
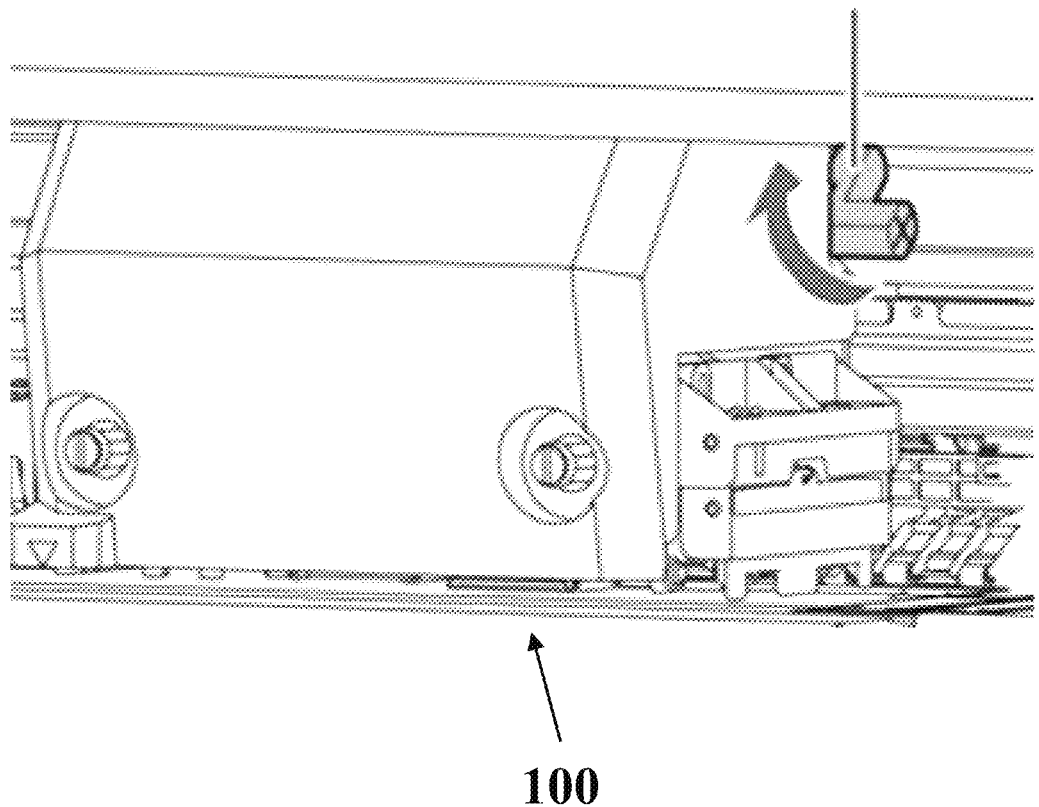
FIG. 1 shows a conventional printer with manual print head height adjustment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments disclosed herein describe systems and methods for automatically adjusting printer head distance (or referred to as printer head height) from a sheet for printing images to infused into a substrate through dye sublimation. An illustrative processor (which may be a part of the printer or a computing device connected to the printer) may adjust the printer head distance based upon an amount of ink coverage and one or more input parameters such as an ambient temperature, an ambient humidity, and a type of the sheet.

The processor may adjust the printer head distance for better image clarity while avoiding head strikes. For lower amount of ink coverage, the print head distance may have to be reduced thereby increasing the likelihood of head strikes. For example, Table 1 shows amount of ink coverage in square feet per liter (SqFt/Liter) for different designs to be printed by the printer.

An ink coverage amount for a design indicates a two-dimensional area (e.g., measured in square feet) per volume of ink (e.g., measured in liters), which may be based upon a design pattern to be printed. For a lower amount of ink coverage, a liter of ink covers a smaller surface area of the sheet. Therefore, for lower amounts of ink coverages, the print head may have to be closer to the sheet compared to higher amounts of ink coverages such that sufficient ink gets to the sheet in the form of inkjets to ensure image clarity. However, the print head being closer to the sheet may cause head-strikes, where the print head impacts the sheet creating ink smudges or any other deformation of the printed material. In Table 1, for example, designs with ink coverage of less than 750 SqFt/Liter may be prone to head strikes (e.g., design nos. 5, 18, 23, 30, and 37). Therefore the processor may have to determine an optimal adjustment that may provide a sufficient image clarity while avoiding head strikes.

Ambient temperature and humidity may affect mechanical and/or chemical properties of the sublimation ink. A higher temperature may cause the ink to be, for example, less viscous and therefore runnier. Moisture from a humid environment may interact with the ink to contribute to the runniness. Furthermore, a higher temperature and higher humidity may affect how the sublimation ink dries once deposited into the sheet. Furthermore, the temperature and humidity may affect the property of the sheet, e.g., the sheet may tend to have more cockling at high temperature, high humidity environment.

The amount of ink coverage may also affect the cockling behavior of the sheet. For example, for a design with a higher ink coverage, the print head may deposit more ink on the sheet, which in turn may cause the sheet to have more cockling. The processor may also determine the amount of cockling of the sheet based upon the ink coverage and the one or more input parameters and accordingly adjust the height of the print head.

In some embodiments, the processor may set a print head height for an entire image being printed on a sheet. In other embodiments, the processor may adjust the print head height dynamically as the image is being printed on a sheet. For example, the processor may set a print head height for a first portion of the image and adjust the print head height for a second portion of the image while the image is being printed.

Figure 2:
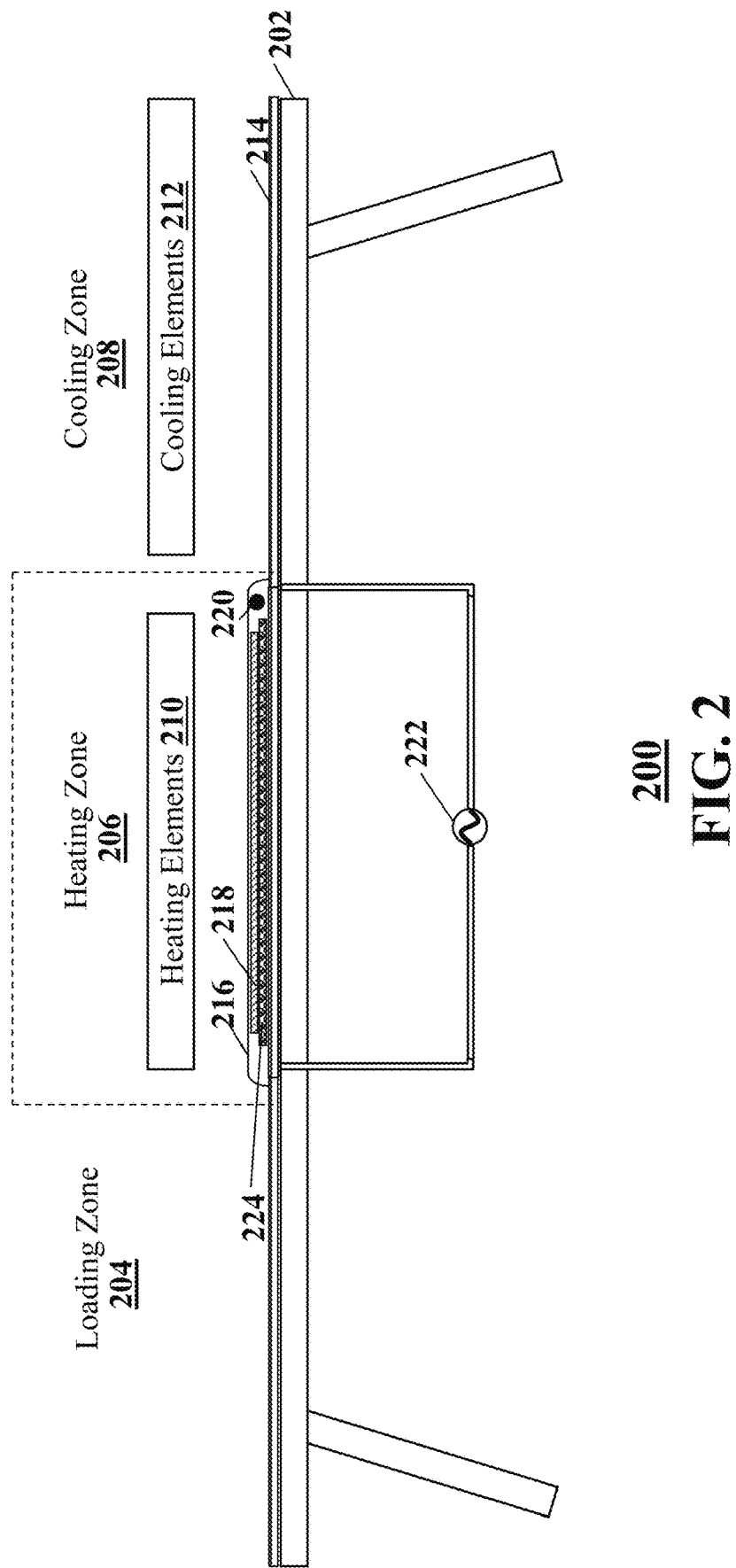
FIG. 2 shows an illustrative dye sublimation machine, according to an embodiment.

FIG. 2 shows an illustrative dye sublimation machine 200, according to an embodiment. It should be understood that the dye sublimation machine 200 shown in FIG. 2 and described herein is merely for illustration and explanation and machines with other form factors and components should also be considered within the scope of this disclosure. For example, dye sublimation machines having additional, alternative, and a fewer number of components than the illustrative dye sublimation machine 200 should be included within the scope of this disclosure.

TABLE 1

Designs and corresponding ink coverage.

| | Design No. | | | | | | | | | | | | |
|---|---|---|---|---|---|---|---|---|---|---|---|---|---|
| | 1 | 3 | 5 | 8 | 9 | 17 | 18 | 21 | 23 | 29 | 30 | 35 | 37 |
| Ink Coverage (SqFt/Liter) | 1000 | 890 | 600 | 825 | 950 | 1040 | 460 | 2900 | 750 | 930 | 600 | 1050 | 655 |

The dye sublimation machine 200 may comprise a sublimation table 202, which may provide structural support for the components of the dye sublimation machine 200. The dye sublimation machine 200 in general and the sublimation table 202 in particular may be divided into three zones: a loading zone 204, a heating zone 206, and a cooling zone 208. The loading zone 204 may allow a worker (or a user) to load a printed sheet 218 and a substrate 224. The printed sheet 224 may have an image thereon printed using sublimation inks containing sublimation dyes. The substrate 224 may be of any type of material such as thermoplastic where the image may be infused through the dye sublimation process. The combination of the printed sheet 218 and the substrate 224 may be loaded onto a bed 214 at the loading zone 204. The bed 214 may be formed by a graphite honeycomb structure. The bed 214 may be configured as a conveyer belt that moves through the loading zone 204, the heating zone 206, and the cooling zone 208.

The heating zone 206 may include heating elements 210. The heating elements 210 may be of any kind such as heating coils in any type configuration. The heating elements 210 may be electrically heated providing a radiative type heating to the combination of the printed sheet 218 and the substrate 224. For example, the heating elements 210 may be included in multiple electrical heaters, each heating a section of the combination of the printed sheet 218 and the substrate. The heating zone 206 may also include a temperature sensor 220 (e.g., a thermocouple) to measure the temperature of the heat generated by the heating elements 210. Within the heating zone 206, a membrane 216 may cover the combination of the printed sheet 218 and the substrate 224. The membrane 216 may be formed by any kind of material that may withstand the heat for repeated heating cycles in the heating zone 206. A vacuum pump 222 may pull down the membrane 216 such that the membrane 216 may cover the combination of the printed sheet 218 and the substrate 224 snugly without air bubbles.

The cooling zone 208 may cool down the combination of the printed sheet 218 and the substrate 224 after the dye sublimation process in the heating zone 206. The cooling zone 208 may include cooling elements 212 such as cold air blowers to expedite the cooling down process. However, it should be understood that the cooling zone 208 may not necessarily include the cooling elements 212 and the substrate 224 may cool down to ambient temperature without the aid of the cooling elements 212. It should also be understood that the loading zone 204 and the cooling zone 208 may be combined in some embodiments. In these embodiments, the combination of the printed sheet 218 and the substrate 224 may be placed on the combined zone providing both loading and cooling functionality, be moved to the heating zone 206, and moved back to the combined zone for cooling. Therefore, it should generally be understood that the configuration of FIG. 2 is merely illustrative and alternative configurations should also be considered within the scope of this disclosure.

In an illustrative operation, a worker may place the substrate 224 on the loading zone 204 and place the printed sheet 218 directly on the substrate 224. The bed 214 may be configured as a conveyer belt, which may move the combination of the printed sheet 218 and the substrate 224 to the heating zone 206. The heating zone 206 may be a covered area within the dye sublimation machine 200. Within the heating zone 206, the vacuum pump 222 may pull a vacuum between the membrane 216 and the bed 214 such that the membrane 216 presses down on the printed sheet 218. The heating elements 210 may generate a requisite amount of heat to sublimate the ink on the printed sheet 218. The sublimated ink may then be deposited on the substrate 224. The temperature sensor 220 may measure the temperature within the enclosure created by the membrane 216 and the bed 214 and the temperature measurement may be used by the heating elements to regulate the generated heat. After the combination of the printed sheet 218 and the substrate 224 are left in the heating zone 206 for a requisite amount of time (e.g., based upon the properties of the substrate 224), the combination of the printed sheet 218 and the substrate 224 is moved to the cooling zone. As described above, the loading zone 204 may also function as the cooling zone 208. The cooling process in the cooling zone 208 may be expedited by the cooling elements 212, which may provide an active source of cooling such as a flow of cold air. After the combination of the printed sheet 218 and the substrate 224 is sufficiently cooled, the combination is removed from the dye sublimation machine 200. After this process, the image in the printed sheet 218 may be infused (or deposited) into the substrate 224.

Figure 3:
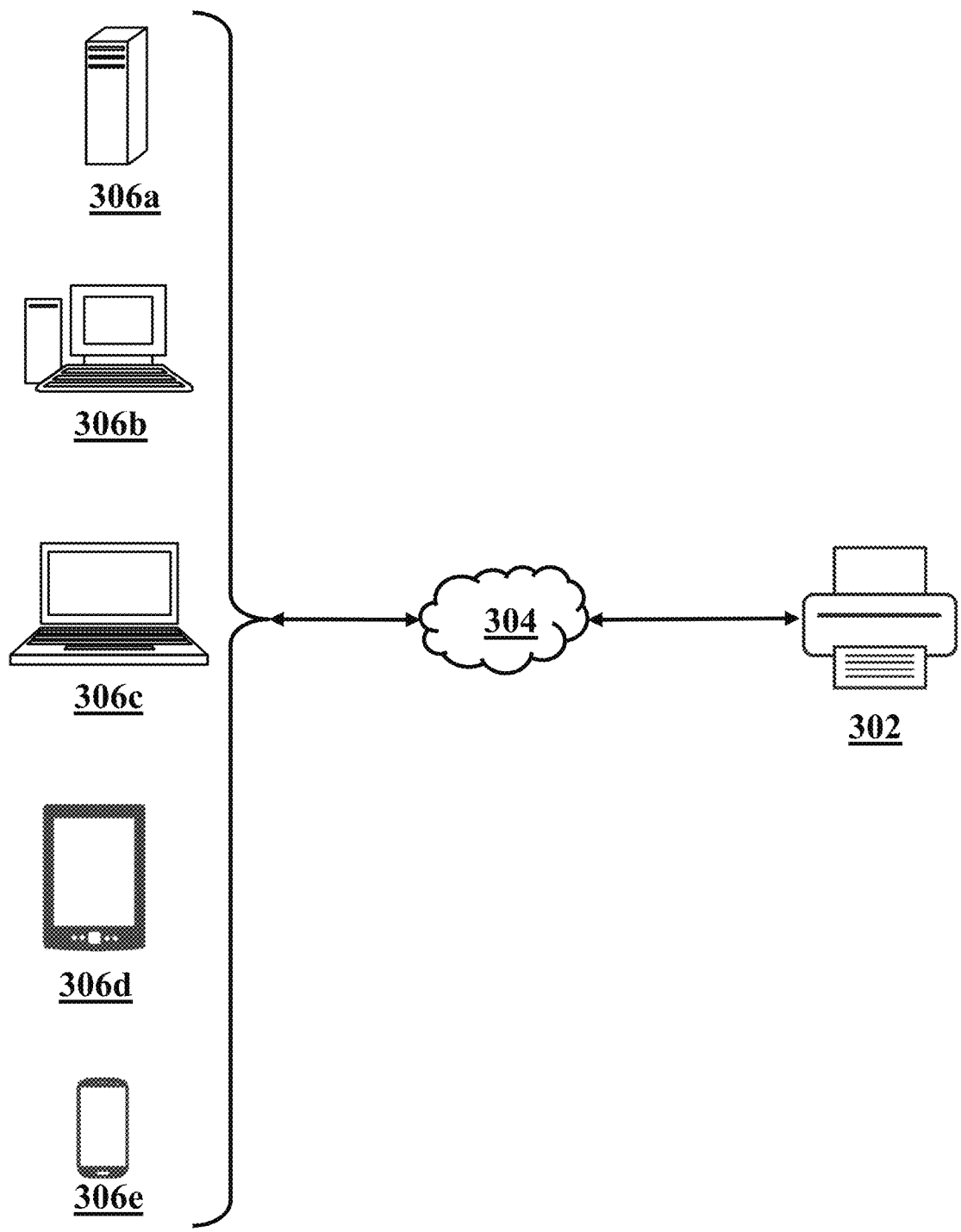
FIG. 3 shows an illustrative system for printing a paper with an image for dye sublimation, according to an embodiment.

FIG. 3 shows an illustrative system 300 for printing a paper (also referred to as sheet) with an image for dye sublimation, according to an embodiment. As shown, the system 300 may comprise a printer 302, a network 304, and computing devices 306a, 306b, 306c, 306d, 306e (collectively or commonly referred to as 306). It should be understood that the system 300 and the aforementioned components are merely for illustration and systems with additional, alternative, and a fewer number of components should be considered within the scope of this disclosure.

The printer 302 may be any type of printer that may print an image with sublimation ink on a paper, which may then be used for dye sublimation to transfer the image to a substrate. For example, the printer 302 may be an inkjet printer that may print the image through jets of ink from a print head to the paper. The printer 302 may include driver software to control the components of the printer. The driver software may include rasterizer modules that may generate a raster image corresponding to a digital image file transmitted by a computing device 306. The printer may include a processor and a non-transitory storage medium that is electrically connected to the processor. The processor may user the raster image to determine the ink coverage for the image or a portion thereof. The non-transitory storage medium may store a plurality of computer program instructions (e.g., the driver software) that the processor may execute to implement the functionality provided by the printer 302.

The printer 302 may provide an interface for a user to enter one or more input parameters that the processor in the printer 302 may utilize to adjust the height of the print head. The one or more input parameters may include, for example, ambient temperature and ambient humidity. For example, the printer may include a graphical user interface allowing the user to enter the one or more input parameters. Alternatively, printer 302 may provide an application programming interface (API) that a computing device 306 may use to provide the one or more input parameters. In some embodiments, the printer 302 may include one or more sensors that may measure at least one of the one or more parameters.

The network 304 may be any kind of local or remote network that may provide a communication medium between the computing devices 306 and the printer 302. For example, the network 304 may be a local area network (LAN), a desktop area network (DAN), a metropolitan area network (MAN), or a wide area network (WAN). However, it should be understood that aforementioned types of networks are merely illustrative and any type of component providing the communication medium between the computing devices 306 and the printer 302 should be considered within the scope this disclosure. For example, the network 304 may be a single wired connection between a computing device 306 and the printer 302.

The computing devices 306 may include any type of processor-based device that may provide digital file, print commands, and/or one or more input parameters to the printer 302 through the network 304. Non-limiting examples of the computing devices 306 include a server 306a, a desktop computer 306b, a laptop computer 306c, a tablet computer 306d, and a smartphone 306e. However, it should be understood that the aforementioned devices are merely illustrative and other computing devices should also be considered within the scope of this disclosure. At minimum, each computing device 306 may include a processor and non-transitory storage medium that is electrically connected to the processor. The non-transitory storage medium may store a plurality of computer program instructions (e.g., operating system, applications) and the processor may execute the plurality of computer program instructions to implement the functionality of the computing device 306.

A computing device 306 may provide an interface for a user to enter one or more input parameters to control the printing process of the printer 302. For example, a user may use a command line interface or a graphical user interface in the computing device 306 to enter parameters such as ambient temperature and ambient humidity that the processor in the printer 302 may use to control the height of the print head. In some implementations, the computing device 305 may include one or more sensors to measure at least one of the one or more parameters. Therefore, it should be understood that the one or more input parameters may be inputted at or retrieved from any part of the system 300. It should also be understood that a functionality attributed to a component of the system 300 is merely for illustration and a similar functionality may be implemented by other components in the system 300. For example, the process of image rasterization to determine the ink coverage may be performed by the processor in the computing device 306 or the processor in the printer 302.

Figure 4:
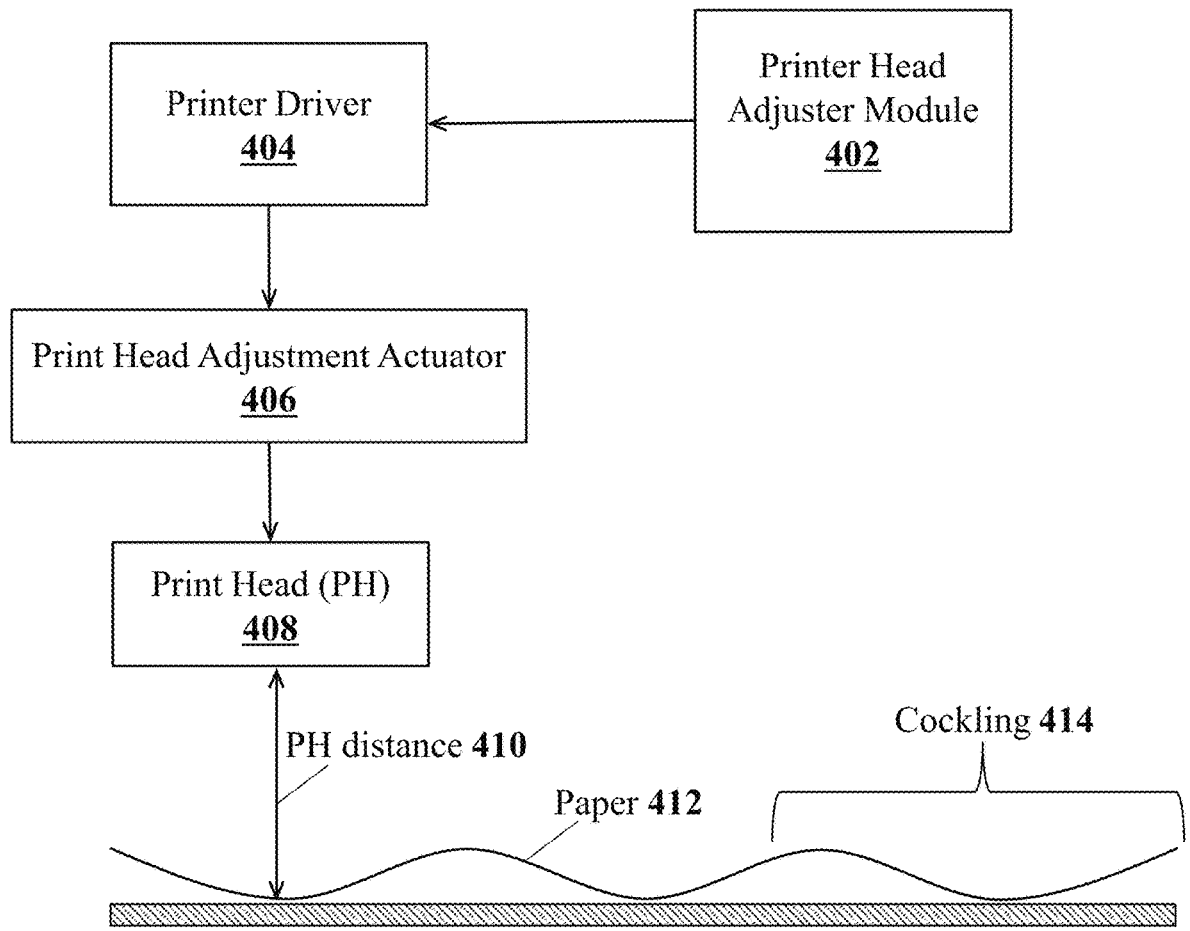
FIG. 4 shows an illustrative system for automatic adjustment of print head height, according to an embodiment.

FIG. 4 shows an illustrative system 400 for automatic adjustment of print head height, according to an embodiment. It should be understood that the components of the system 400 shown in FIG. 4 and described herein are merely illustrative and additional, alternative, or a fewer number of components should also be considered within the scope of this disclosure.

The system may comprise a print head 408 which may transfer sublimation ink to a paper 412 (also referred to as sheet) to form an image on the paper 412. The sublimation ink may contain sublimation dyes that may be sublimated under heat and deposited to a substrate thereby infusing the image to the substrate. The print head 408 may transfer the sublimation ink to the paper by any type of printing method. For example, the print head 408 may implement an inkjet printing method where jets of the sublimation ink may be transmitted towards the paper 412.

A printer driver 404 may include software modules to enable the functionality of the print head 408. The printer driver 404, when executed by a processor (e.g., a printer processor) may instruct the print head 408 to transmit predetermined quantities of sublimation ink to the paper 412. For example, the printer driver 404 may determine from a raster file, a combination of different colors of sublimation ink and accordingly instruct the print head 408 to transmit the combination to the paper 412. A print head adjuster module 402 may provide instructions to the printer driver 404 for adjusting a printer head distance 410 (also referred to as printer head height). For example, the printer head adjuster module 402 may determine the amount of ink coverage for a portion of the image being printed. The printer head adjuster module 402 may also retrieve one or more input parameters. The one or more input parameters may include environmental parameters such as ambient temperature and ambient humidity. The one or more input parameters may also include the type of the paper 412. Based upon the amount of ink coverage for the portion of the image and the one or more input parameters, the print head adjuster module 402 may provide instructions to the printer driver 404 containing a print head distance 410 to be set.

The printer driver 404 may provide instructions to a print head adjustment actuator 406 to adjust the print head distance 410. The print head adjustment actuator 406 may include any kind of mechanical or electromechanical apparatus that may provide a motive force to the print head 408 to move towards or away from the paper 412. For example, the print head adjustment actuator 406 may include an electric motor coupled to a shaft where the print head 408 may be mounted on. The rotary movement of the electric motor may be translated into a linear movement of the shaft to move the print head 408 thereby adjusting the print head distance 410. The print head adjustment actuator 406 may be pneumatic, where the motive power to move the print head 408 may be generated by the change in air pressure. The print head adjustment actuator 406 may be thermal, where the motive power for moving the print head 408 is provided by metallic expansion. It should however be understood that the aforementioned motive mechanisms for the print head adjustment actuator 406 are merely illustrative and any other mechanism that may impart a controlled movement to the print head 408 should be considered within the scope of this disclosure. Regardless of the source of motive power, a controller in the print head adjustment actuator 406 may receive adjustment instructions from the printer driver and accordingly instruct the motive mechanism to move the print head. For example, the controller may regulate a flow of electricity to the electric motor thereby causing the electric motor to provide the requisite movement of the print head 408.

It should be understood that the two dimensional movement for adjusting the print head 406 is merely illustrative and other movements should be considered within the scope of this disclosure. For example, the print head adjustment actuator 406 may cause the print head 408 to move at an angle, for example, change the angle of orientation between the print head 408 and the paper 412. Furthermore, the print head adjustment actuator 406 may cause the print head to adjust for cockling 414 based upon one or more instructions received from the printer driver 404.

Figure 5:
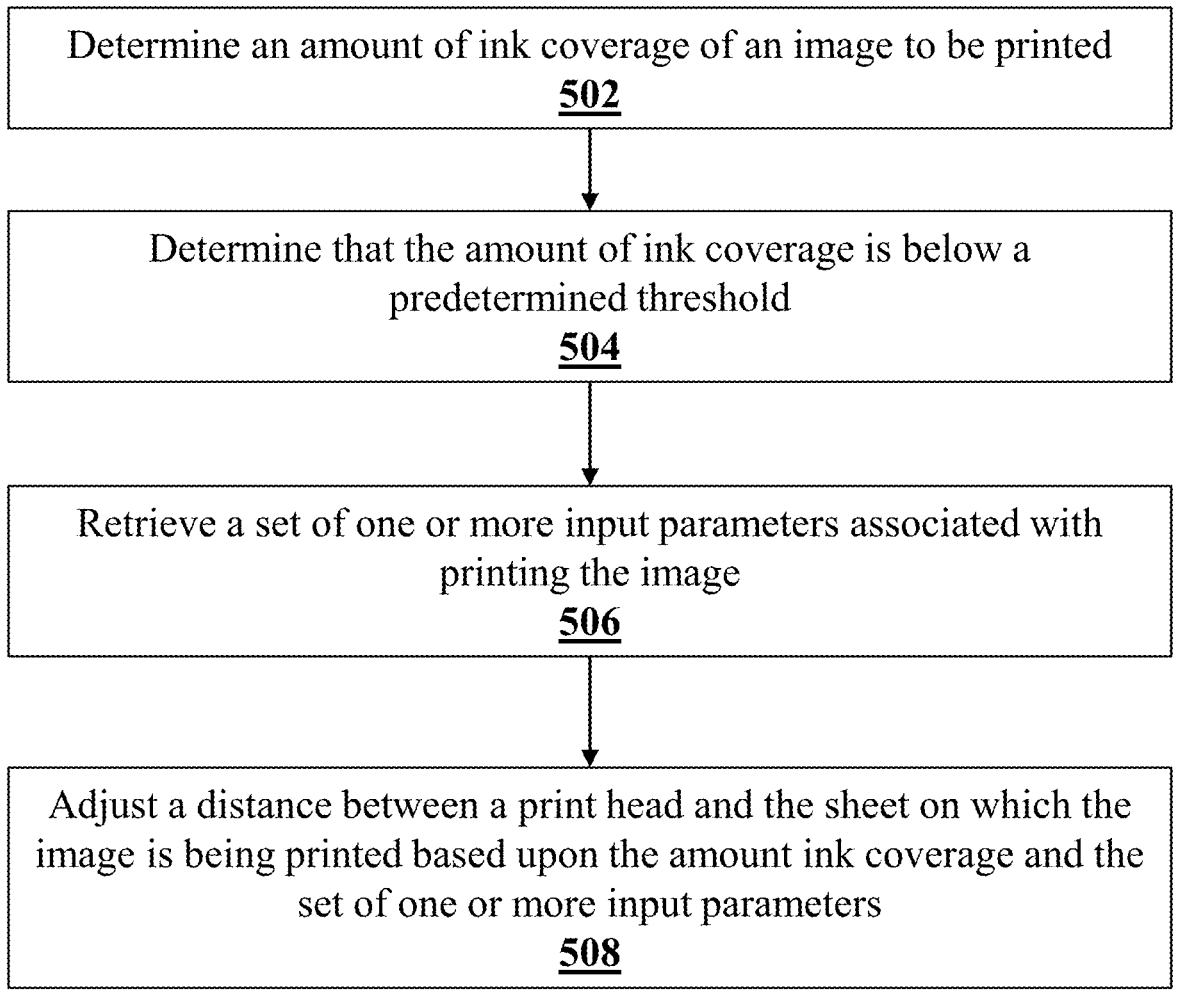
FIG. 5 shows a flow diagram of an illustrative method for automatically adjusting print head height, according to an embodiment.

FIG. 5 shows a flow diagram of an illustrative method 500 for automatically adjusting print head height, according to an embodiment. It should be understood that the steps shown in FIG. 5 and described herein are merely illustrative and alternative, additional, and fewer number of steps should also be considered within the scope of this disclosure. Although multiple components may perform one or more steps of the method 500, the following describes, for brevity, a single processor executing the steps of the method 500.

The method 500 may begin at step 502, where the processor may determine an amount of ink coverage of an image to be printed. The ink coverage may be measured in terms of the surface of area of sheet to be covered by a unit volume of the ink (e.g., SqFt/Liter). The ink may be sublimation ink containing sublimation dyes thereby allowing the image to be infused into a substrate (e.g., a thermoplastic) through dye sublimation.

At a next step 504, the processor may determine that the amount of ink coverage is below a predetermined threshold. A lower amount of ink coverage may require the print head to be lowered (e.g., the distance between the print head and the sheet be reduced) to achieve a level of image clarity. While image clarity may be achieved by lowering the print head, the reduced distance may increase the likelihood of print head strikes. Therefore, the processor may have to optimize the distance such that the printer may print the image with sufficient clarity and avoid the print head strikes at the same time.

At a next step 506, the processor may retrieve a set of one or more input parameters associated with printing the image. The set of one or more input parameters may include, for example, ambient temperature, ambient humidity, and the type of sheet. These input parameters may affect the mechanical and/or chemical properties of the sublimation ink and/or the sheet. The one or more parameters may be measured by one or more sensors associated with the printer and/or a computing system associated with the printer. Alternatively or additionally, the one or more parameters may be entered by the user on an interface on the printer and/or the computing system associated with the printer.

At a next step 508, the processor may adjust the distance between the print head and sheet based upon the amount of ink coverage and the set of one or more input parameters. For example, the processor may provide instructions to an actuator connected to the print head to move the print head to an optimal position accounting for the amount of ink coverage and the mechanical and/or chemical effects of the set of one or more input parameters. In some embodiments, the processor may set the distance between the print head and the sheet for the entire image. For a second image, the computer may set a second distance between the print head and a second sheet based upon the corresponding set of parameters.

FIG. 6 shows a flow diagram of an illustrative method 600 for automatically adjusting print head height, according to an embodiment. It should be understood that the steps shown in FIG. 6 and described herein are merely illustrative and alternative, additional, and fewer number of steps should also be considered within the scope of this disclosure. Although multiple components may perform one or more steps of the method 600, the following describes, for brevity, a single processor executing the steps of the method 600.

The method 600 may begin at step 602, where the processor may determine an amount of ink coverage of a portion of an image to be printed on a sheet using sublimation ink. In the illustrative method 600, the different portions of the image may have different amounts of ink coverage, owing to different patterns within the image. Therefore, as described in the subsequent steps below, the processor may dynamically adjust the distance between the print head and sheet for different portions of the image while printing the image.

At a next step 604, the processor may retrieve a set of one or more input parameters associated with printing the portion of the image. The one or more parameters may include, for example, ambient temperature, ambient humidity, and the type of the sheet. At least one of the one or more parameters may change while printing, for example, the ambient temperature may change due to heat generated by machinery at the vicinity of the printer, and therefore the processor may dynamically track the changes in the parameter to dynamically adjust the distance between the print head and the sheet while printing. The one or more parameters may be measured by one or more sensors or may be inputted at one or more interfaces.

At a next step 606, the processor may set a distance between the print head and the sheet on which the portion of the image is being printed based upon the corresponding amount of ink coverage and the set of one or more parameters. In other words, the processor may set the distance for a local area within the image based upon the corresponding ink coverage and the input parameters.

At a next step 608, the processor may dynamically adjust while printing the distance between the print head and the sheet for a second portion of the image. The second portion may have a different design requiring a different amount of ink coverage and the input parameters may change as the printing transitions from the first portion to the second portion. Therefore, the processor may adjust while printing the distance between the print head and the sheet based upon a second amount of second amount of ink coverage for the second portion and a second set of one or more parameters associated with printing the second portion.

FIG. 7 shows a flow diagram of an illustrative method 700 for automatically adjusting print head height, according to an embodiment. It should be understood that the steps shown in FIG. 7 and described herein are merely illustrative and alternative, additional, and fewer number of steps should also be considered within the scope of this disclosure. Although multiple components may perform one or more steps of the method 700, the following describes, for brevity, a single processor executing the steps of the method 700.

The method 700 may begin at step 702, where the processor may determine an amount of ink coverage of a portion of the image to be printed. The amount of the ink coverage may be based upon the design pattern in the portion of the image. At a next step 704, the processor may retrieve a set of one or more input parameters associated with printing the portion of the image. The input parameters, retrieved from sensors and/or input interfaces, may include ambient parameters such as temperature and humidity, and the type of sheet. At a next step 706, the processor may adjust a distance between the print head and the sheet based upon the ink coverage and the set of one or more input parameters. The processor may adjust the distance for maintaining image clarity while avoid print head strikes.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for printing an image to be infused into a substrate through dye sublimation, the method comprising:
   determining, by a computer, an amount of ink coverage of the image to be printed on a sheet using sublimation ink;
   in response to the computer determining that the amount of ink coverage is below a predetermined threshold:
   retrieving, by the computer, a set of one or more input parameters associated with printing the image; and
   adjusting, by the computer, a distance between a print head and the sheet on which the image is being printed based upon the amount of ink coverage and the set of one or more input parameters, wherein the distance remains constant throughout the printing of the image.

2. The computer-implemented method of claim 1, wherein the set of one or more input parameters includes at least one of an ambient temperature, an ambient humidity, or a type of the sheet.

3. The computer-implemented method of claim 1, wherein the computer adjusts the distance between the print head and the sheet to minimize the distance while avoiding head strikes.

4. The computer-implemented method of claim 1, further comprising:
   retrieving, by the computer, at least one of the set of one or more input parameters from a sensor.

5. The computer-implemented method of claim 1, further comprising:
   retrieving, by the computer, at least one of the set of one or more input parameters as user inputs on an interface associated with the computer.

6. The computer-implemented method of claim 1, further comprising:
   rasterizing, by the computer, a digital file of the image to determine the amount of ink coverage of the image.

7. The computer-implemented method of claim 1, further comprising:
   determining, by the computer, a second amount of ink coverage of a second image to be printed on a second sheet using sublimation ink;
   in response to the computer determining that the second amount of ink coverage is below the predetermined threshold:
   retrieving, by the computer, a second set of one or more input parameters associated with printing the second image; and
   adjusting, by the computer, a second distance between the print head and the second sheet on which the second image is being printed based upon the second amount of ink coverage and the second set of one or more input parameters, wherein the second distance remains constant throughout the printing of the second image.

\* \* \* \* \*